United States Patent
Yang et al.

(10) Patent No.: US 8,917,573 B2
(45) Date of Patent: Dec. 23, 2014

(54) MEASURING FAR FIELD SIGNATURE OF A SEISMIC SOURCE

(75) Inventors: Luren Yang, Oslo (NO); Chao Tan, Jilin (CN); Aslaug Stroemmen Melboe, Bekkestua (NO)

(73) Assignee: WesternGeco L.L.C., Houston, TX (US)

( * ) Notice: Subject to any disclaimer, the term of this patent is extended or adjusted under 35 U.S.C. 154(b) by 1033 days.

(21) Appl. No.: 12/174,200

(22) Filed: Jul. 16, 2008

(65) Prior Publication Data

US 2010/0014382 A1 Jan. 21, 2010

(51) Int. Cl.
*G01V 1/38* (2006.01)
*G01V 1/00* (2006.01)

(52) U.S. Cl.
CPC . *G01V 1/006* (2013.01); *G01V 1/38* (2013.01); *G01V 1/3861* (2013.01); *G01V 1/3808* (2013.01)
USPC .............................. 367/20; 367/15

(58) Field of Classification Search
CPC ................................ G01V 1/38; G01V 1/3861
USPC ................................ 367/15, 20–24
See application file for complete search history.

(56) References Cited

U.S. PATENT DOCUMENTS

| | | | |
|---|---|---|---|
| 4,476,550 A | 10/1984 | Ziolkowski et al. | |
| 4,476,553 A * | 10/1984 | Ziolkowski et al. | 367/144 |
| 4,648,080 A * | 3/1987 | Hargreaves | 367/20 |
| 4,868,794 A * | 9/1989 | Ziolkowski et al. | 367/23 |
| 5,247,486 A * | 9/1993 | Regnault | 367/23 |
| 6,081,765 A * | 6/2000 | Ziolkowski | 702/17 |
| 7,218,572 B2 * | 5/2007 | Parkes | 367/23 |
| 2006/0250890 A1* | 11/2006 | van den Berg et al. | 367/24 |
| 2007/0258322 A1 | 11/2007 | Hopperstad | |

OTHER PUBLICATIONS

PCT Search Report, dated Mar. 2, 2010, Application No. PCT/US2009/050583.

* cited by examiner

*Primary Examiner* — Krystine Breier

(57) ABSTRACT

To estimate a far-field signature of a seismic source having plural source elements, seismic receivers are provided to receive signals from the seismic source elements of the seismic source. Seismic receivers are dynamically associated with different seismic source elements over time, and the far-field signature of the seismic source is computed according to the measurement data taken by the seismic receivers.

17 Claims, 3 Drawing Sheets

MEASURING FAR FIELD SIGNATURE OF A SEISMIC SOURCE

TECHNICAL FIELD

The invention relates generally to estimating the far-field signature of a seismic source.

BACKGROUND

Seismic surveying is used to perform characterization of subterranean elements in a subterranean structure. Examples of subterranean elements of interest include hydrocarbon-bearing reservoirs, fresh water aquifers, gas injection zones, and other subterranean elements. Seismic surveying is performed by deploying seismic sources (e.g., air guns, vibrators, explosives, etc.) and seismic receivers (e.g., hydrophones, geophones, etc.). The seismic sources are used to produce seismic waves (e.g., acoustic waves) that are propagated into the subterranean structure, with some of these seismic waves reflected from the subterranean elements of interest. The reflected seismic waves are received by the seismic receivers.

In a marine survey environment, survey hardware components (e.g., sources and receivers) can be towed through a body of water. An interesting characteristic of a seismic source is the seismic source's far-field signature. The signature of the seismic source refers to the shape of the signal transmitted by the seismic source. The signature of the seismic source varies with distance from the seismic source. Along a given direction, this signature varies with increasing distance from the seismic source, until at some given distance, the signature achieves a relatively stable shape. At greater distances than this given distance, the signature remains the same, but the amplitude decreases inversely proportional to the distance. The region where the signature shape does not change significantly with distance is known as the far field of the seismic source.

In many scenarios, it is difficult, if not impossible, to measure the far-field source signature in a direct way. For example, in the continental shelf, the water depth is insufficient to prevent the measurements from being substantially affected by sea-bottom reflections. Other practical obstacles also exist to perform true far-field measurements. A conventional technique of obtaining knowledge about far-field signatures is to estimate the far-field signatures based on near-field measurements, obtained normally by hydrophones mounted next to the seismic source elements. Alternatively, a far-field of a source can be estimated according to a model of the far-field signature based on measured physical parameters.

Conventional techniques for estimating the far-field signature can only provide a signature of limited time length. Conventionally, this time length is about 0.5 seconds, depending on tow speed, which is equivalent to the marine vessel speed relative to the water. The length is shorter when the towing speed is higher. Although the 0.5-second length is sufficient in many cases, it may not be sufficient in other cases.

SUMMARY

In general, according to an embodiment, a method of estimating a far-field signature of a seismic source having plural source elements is provided. The estimating method involves associating seismic receivers with different seismic source elements over time, with the far-field signature of the seismic source computed according to the measurement data taken by the seismic receivers.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a technique is provided of estimating a far-field signature of a seismic source that has multiple source elements, which can be arranged in an array (a one-dimensional array, two-dimensional array, or three-dimensional array). A signature of a seismic source refers to the shape of the signal transmitted by the seismic source. The signature of the seismic source varies with distance from the seismic source, until at some given distance, the signature achieves a relatively stable shape. The region (with distances greater than the given distance) where the signature shape does not change significantly is known as the far field of the source, and such signature is referred to as the far-field signature.

Figure 1:
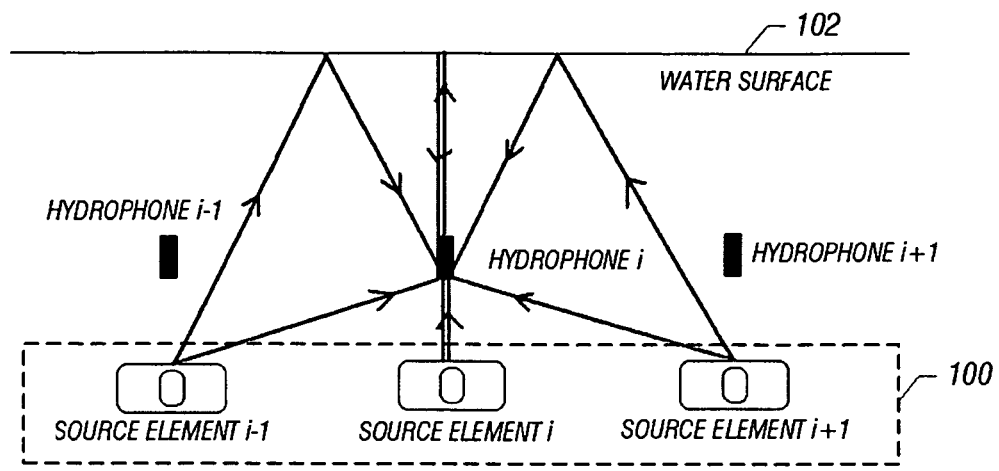
FIG. 1 is a schematic representation of a first example arrangement of a seismic source and seismic receiver elements.

FIG. 1 depicts an example arrangement of a seismic source 100 that includes an array of source elements, referred to in the example as source element i−1, source element i, and source element i+1. In one example, the source elements are air guns. Also depicted in FIG. 1 is an arrangement of seismic receiver elements (e.g., hydrophone i−1, hydrophone i, and hydrophone i+1).

Assume that the source array has N source elements. Conventionally, it is assumed that N receiver elements (e.g., hydrophones) are fixedly associated with corresponding N source elements, with each particular hydrophone fixedly associated with the closest corresponding source element. As shown in FIG. 1, the measured data in the i'th hydrophone is a linear combination of the signal coming directly from the N source elements and those reflected by the water surface 102:

$$h_i(t) = \sum_{j=1}^{N} \left[ \frac{1}{a_{ij}} p_j\left(t - \frac{a_{ij}}{c}\right) + s \frac{1}{b_{ij}} p_j\left(t - \frac{b_{ij}}{c}\right) \right], \quad \text{(Eq. 1)}$$

where $h_i(t)$ is the measurement of the i'th hydrophone at time t, $p_j(t)$ is the signal from the j'th source element at time t, $a_{ij}$ is the distance between the i'th hydrophone and the j'th source element, $b_{ij}$ is the path length of the reflected ray from the j'th source element to the i'th hydrophone, s is the reflection coefficient of the water surface, and c is the sound velocity. Assume that the distances $a_{ij}$ and $b_{ij}$ are known, then Eq. 1 gives N equations with N unknowns, $p_j(j=1, 2, \ldots N)$. There are several different ways to solve the equations and obtain $p_j$. With the values of $p_j$, the far-field source signature is given by:

$$P(t) = \sum_{j=1}^{N} \left[ \frac{1}{r_j} p_j\left(t - \frac{r_j}{c}\right) + s \frac{1}{r'_j} p_j\left(t - \frac{r'_j}{c}\right) \right], \quad \text{(Eq. 2)}$$

where $r_j$ is the distance between the j'th source element and the far-field location, and $r'_j$ is the path length of reflected ray from the j'th source element to the far-field location.

One conventional way of solving Eq. 1 is a conventional recursive method. The conventional recursive method requires that the i'th hydrophone is closer to the i'th source element than all the other source elements, and $b_{ij}$ is larger than $a_{ij}$. Assume that $p_j(t)$ is 0 with negative t values. Then, at time $$t = \frac{a_{ii}}{c},$$

Eq. 1 becomes $$h_i\left(\frac{a_{ii}}{c}\right) = \frac{1}{a_{ii}} p_i(0). \quad \text{(Eq. 3)}$$

Using Eq. 3, the algorithm can compute $p_i(0)$ for i=1, 2, 3, ... N. Then, $P_i(t)$ for t>0 can be computed recursively by using Eq. 1, using computed $p_i$ values at earlier time. The value $p_i(t)$ is referred to as the notional source of source element i.

The conventional recursive method mentioned above makes the following assumptions that are normally not valid for a relatively long time period (e.g., >0.5 seconds):
(1) $a_{ij}$ and $b_{ij}$ are constants over the time;
(2) the i'th hydrophone is closer to the i'th source element than all the other source elements.

Normally, the source elements are implemented with air guns. With an air gun, the seismic signal is produced by air bubbles released by the air gun after activation of the air gun. Because of motion of the air bubbles relative to the hydrophones, the above two constraints are violated. The hydrophones are towed by the marine vessel together with the source array, and the air bubbles are freely moving in the water. This causes a horizontal relative motion between the hydrophones and the air bubbles. The speed of the relative motion is the marine vessel speed (speed of vessel relative to the water). In addition, the air bubbles are moving upwardly. This gives a vertical relative motion between the hydrophones and the air bubbles.

Due to the violation of the above assumptions, the conventional recursive method can only be used in a short period after the source firing, typically 0.5 seconds with a typical vessel speed. Typically, the vessel speed is about 2 to 3 meters per second, the distance between two neighboring source elements in the towing direction is about 3 meters, and the hydrophones are placed 1 meter over each source element. In this case, the air bubble released from a given source element will be closer to the hydrophone above the next source element behind the given source element after 0.5 seconds. In other words, after 0.5 seconds, the second assumption is violated. As a result, the computed far-field signature will be inaccurate after 0.5 seconds.

In accordance with some embodiments, an algorithm is applied to resolve the above issues. The algorithm according to some embodiments have the following features:

(1) Determine $a_{ij}$ and $b_{ij}$ dynamically. These two values are no longer constants. They are computed according to the known (measured or assumed) array geometry, vessel speed relative to the water, and air bubble rising speed. The array geometry is measured using GPS (global positioning system) devices mounted on floats, or using optical and/or acoustic techniques. The GPS speed plus the current speed with give the vessel speed relative to the water.

(2) There is no fixed one-to-one association between the source elements and the hydrophones in the computation. Each hydrophone is associated to the closest air bubble at each time point, according to the $a_{ij}$ and $b_{ij}$ values computed dynamically at the time point.

Figure 2:
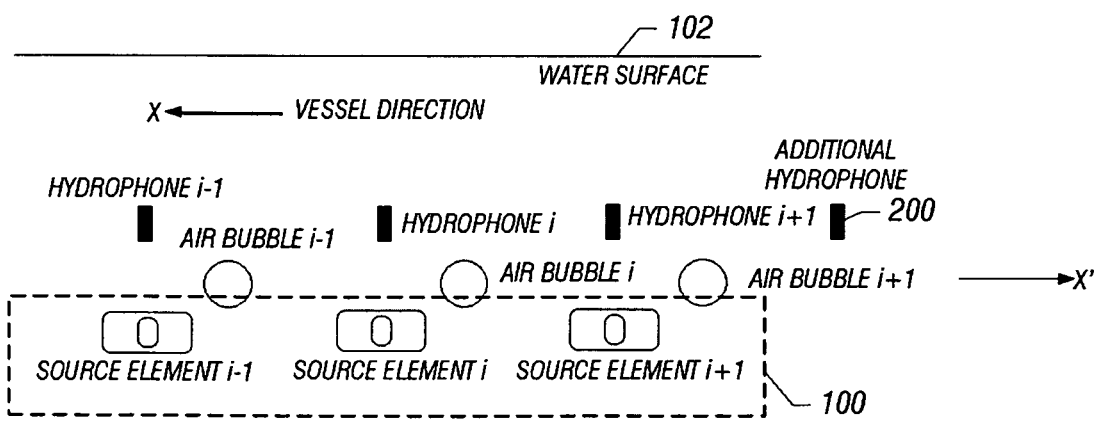
FIG. 2 is a schematic representation of a second example arrangement of a seismic source and seismic receiver elements.

Since the air bubble is moving backwards related to the seismic source, at least one additional hydrophone 200 is provided behind the seismic source 100, as shown in FIG. 2. This is to ensure that, at each time point, every air bubble is associated with a hydrophone that is located closer to the hydrophone than all other air bubbles. In this case, Eq. 3 becomes:

$$h_{i(t)}\left(\frac{a_{i,i(t)}}{c}\right) = \frac{1}{a_{i,i(t)}} p_i(0) \quad \text{(Eq. 3a)}$$

where i(t) is the index of the hydrophone which is closest to air bubble i at time t. In other words, as the air bubble i moves backwardly relative to the hydrophones, hydrophone i(t) is closest to the air bubble i at time t, where i(t) changes with t. For example, at time $t_0$, air bubble i may be closest to hydrophone 1; at time $t_1$, air bubble i may be closest to hydrophone 2 behind hydrophone 1; and so forth.

As depicted in FIG. 2, the seismic source 100 has an array of source elements, and corresponding hydrophones i−1, i, and i+1 are provided at some distance with respect to the source elements i−1, i, and i+1. Note that the hydrophones can be towed on a first cable, whereas the source elements can be towed on a second cable. Alternatively, the source elements and hydrophones can be towed on the same cable. At least one additional hydrophone 200 is provided behind the last of the source elements (in the in-line direction). The in-line direction is the direction of movement of the source and receiver elements.

FIG. 2 also depicts air bubbles i−1, i, and i+1, which move in direction x' opposite to the direction x (in-line direction) of the marine vessel.

As a given air bubble i moves in direction x' relative to the source elements and hydrophones, the association of the air bubble i with a hydrophone changes. In other words, at some initial time, the air bubble i is originally associated with hydrophone i. Later in time, as the air bubble i moves closer to hydrophone i+1, then the air bubble i becomes associated with hydrophone i+1.

As a result, $a_{i,i(t)}$ in Eq. 3a dynamically changes over time. Recall that the parameter $a_{ij}$ in Eq. 1 above represents the distance between the i'th hydrophone and the j'th source element. However, in accordance with some embodiments, since the association of source element (and more specifically, the air bubble) and hydrophone can change over time, due to movement of the air bubble in direction x', the value of $a_{i,i(t)}$ would also change over time. Initially, the value of $a_{i,i(t)}$ would be the distance between the i'th hydrophone and j'th source element. As time goes on, i(t) changes such that the association between source elements and hydrophones dynamically changes. Once the values of $p_i(t)$ are calculated by solving Eq. 3a such as by using a recursive method, then the far-field source signature can be computed according to Eq. 2 above.

In accordance with some embodiments, a smoothing algorithm can be applied to each computed notional source, $p_i(t)$. The smoothing is performed because i(t) changes value in the time period of interest, and the computed $p_i(t)$ may not be a smooth function around the time t' when i(t) changes its value. This is due to the uncertainty of the source array geometry measurement, and the vessel and current speed. Assume that, before t' the air bubble i is closer to hydrophone m, and after t' it is closer to hydrophone n. Smoothing is performed in a short time period $t'-t_0$ to $t'+t_0$. The algorithm can be as follows: before $t'-t_0$, hydrophone m is used in the computation, in other words, i(t)=m; after $t'+t_0$ the algorithm uses hydrophone n in the computation, in other words, i(t)=n, and during period $t'-t_0$ to $t'+t_0$, a smoothing algorithm is applied to take consideration of both hydrophone m and hydrophone n. The following smoothing algorithm can be used to compute $p_i(t)$:

$$p_i(t) = \frac{t - t' + t_0}{2t_0} p_{i,n}(t) + \frac{t' + t_0 - 1}{2t_0} p_{i,m}(t), \quad (Eq. 4)$$

where $P_{i,n}(t)$ is the $p_i(t)$ value computed by purely using the n'th hydrophone, and $P_{i,m}(t)$ is that computed by purely using the m'th hydrophone. The value $p_i(t)$ computed by Eq. 4 is a weighted average of $p_{i,n}(t)$ and $p_{i,m}(t)$.

There is an alternative to the above method. In this alternative, there is no additional hydrophone(s) behind the last source element. Then, the value of $p_i(t)$ for the last source element after the time limit t' is computed by using a modeling approach. The accuracy will be reduced, but may still be sufficient as the contribution of the last element to the whole source array is quite limited. In this alternative approach, the arrangement would be as depicted in FIG. 1, except that the modeling approach would be used.

The modeling approach involves the use of a model to predict the signal that would have been measured at the additional hydrophone(s) if such hydrophone(s) existed.

Figure 3:
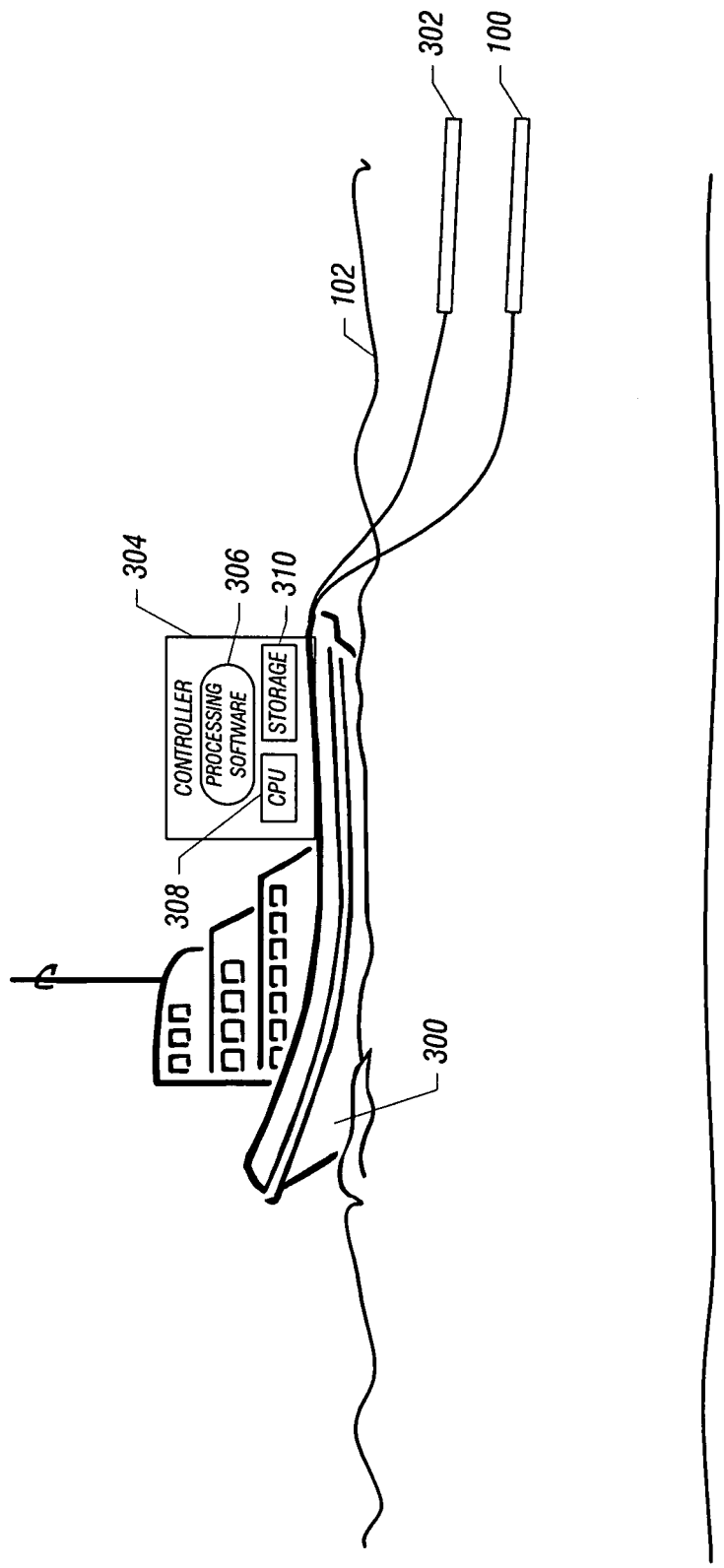
FIG. 3 illustrates a marine vessel towing a seismic source and seismic receiver elements.

FIG. 3 illustrates an example arrangement in which a marine vessel 300 on the water surface 102 is used to tow the seismic source 100 and an arrangement 302 of seismic receiver elements. In an alternative arrangement, instead of using two different structures (e.g., cables) to carry the hydrophones and seismic source, the same structure can be used instead.

In operation, the seismic source 100 is activated to cause the source elements in seismic source 100 to release air bubbles. These air bubbles produce seismic signals that are detected by the hydrophones in the seismic receiver arrangement 302. Note that the seismic receiver arrangement 302 can either be the arrangement depicted in FIG. 1 or FIG. 2.

A controller 304 is provided on the marine vessel 300. The controller 304 can be implemented with a computer, for example. The controller 304 can be connected by a communications link to the seismic receiver arrangement 302 to receive measurement data from the seismic receivers in the seismic receiver arrangement 302. The controller 304 includes processing software 306 that can be executable on one or more central processing units (CPUs) 308. The CPU(s) 308 is (are) connected to a storage 310. The processing software 306 is able to perform estimation of a far-field signature of the seismic source in accordance with the algorithms discussed above.

Figure 4:
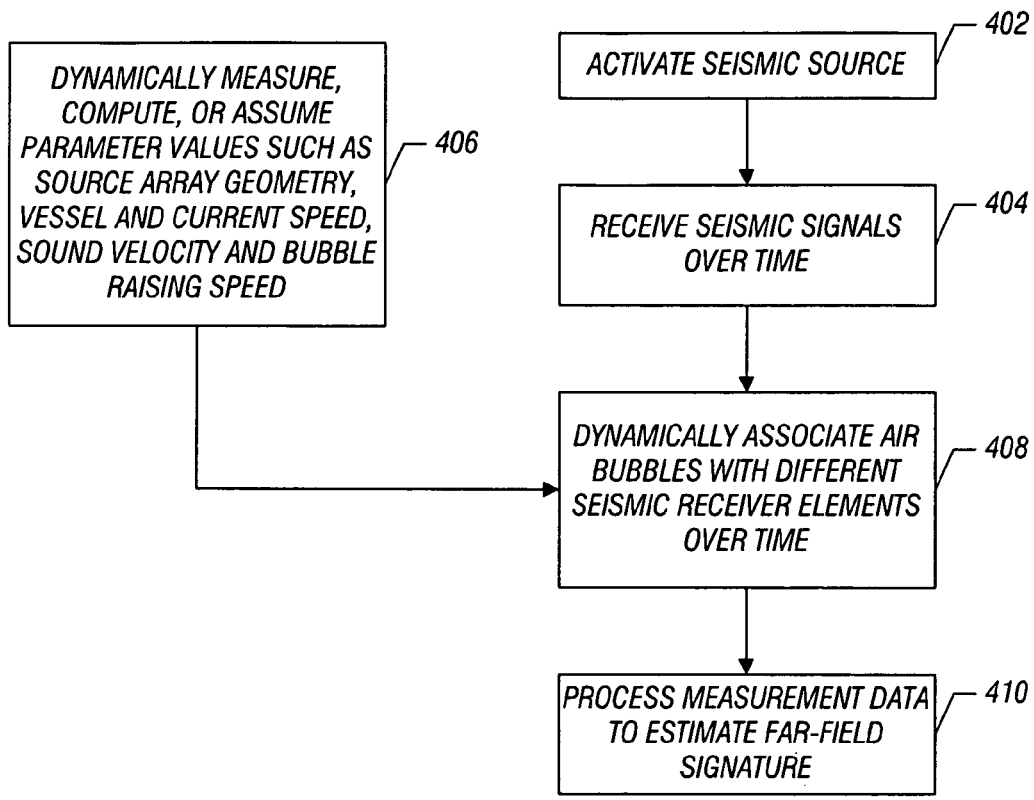
FIG. 4 is a flow diagram of a procedure according to an embodiment.

FIG. 4 illustrates an example flow diagram of a procedure to perform far-field signature estimation according to an embodiment. The seismic source is activated (at 402), which causes air bubbles to be released from respective seismic elements in the seismic source.

The seismic receiver elements in the seismic receiver arrangement receive (at 404) signals over time, where the signals are due to the air bubbles. Also, various parameter values as discussed above are dynamically measured, computed, or assumed (at 406), such as source array geometry, vessel speed and current speed, sound velocity, and bubble rising speed.

In accordance with some embodiments, the air bubbles are dynamically associated (at 408) with different seismic receiver elements over time due to motion of the air bubbles relative to the seismic receiver arrangement 302.

The measurement data is then processed (at 410) to estimate the far-field signature of the seismic source, using Eqs. 3a and 4 above, in some implementations.

In other implementations, as noted above, where an additional seismic receiver element(s) (e.g., 200 in FIG. 2) is not used, then a modeling approach can be performed to model the measurement that would have been made by the additional receiver element(s).

Instructions of software described above (including processing software 306 of FIG. 3) are loaded for execution on a processor (such as one or more CPUs 308 in FIG. 3). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of estimating a far-field signature of a seismic source having plural seismic source elements, comprising:
    towing the seismic source elements on a first cable;
    providing a plurality of seismic receivers to receive signals from the seismic source elements of the seismic source, wherein the plurality of seismic receivers are provided to measure data useful for computing the far-field signature of the seismic source, and wherein providing the plurality of seismic receivers comprises providing more of the plurality of seismic receivers than the seismic source elements and providing at least one additional seismic receiver of the plurality of seismic receivers behind a last seismic source element of the seismic source in an in-line direction, the plurality of seismic receivers including the at least one additional seismic receiver being towed on the first cable that tows the seismic source elements;

dynamically associating the seismic receivers with different ones of the seismic source elements over time, wherein dynamically associating the seismic receivers with the different ones of the seismic source elements comprises dynamically varying, over time, parameters representing distances between the seismic receivers and seismic source elements in a formula; and computing, by solving the formula, the far-field signature of the seismic source according to measurement data taken by the seismic receivers.

2. The method of claim 1, wherein dynamically associating the seismic receivers with different ones of the seismic source elements comprises dynamically associating air bubbles released by the seismic source elements with different ones of the seismic receivers over time.

3. The method of claim 1, wherein solving the formula comprises using a recursive technique to determine values that vary as a function of time.

4. The method of claim 3, further comprising computing the far-field signature using the determined values.

5. The method of claim 3, further comprising applying a smoothing algorithm to smooth the values.

6. The method of claim 1, wherein dynamically varying the parameters is based on a geometry of the arrangement of the seismic source elements and seismic receivers, marine vessel speed, and rising speed of air bubbles released by the seismic source elements.

7. An apparatus comprising:
a seismic source having seismic source elements to be towed in a body of water;
seismic receiver elements; and
a controller to:
dynamically associate the seismic receiver elements with different ones of the seismic source elements over time;
compute a far-field signature of the seismic source according to measurement data taken by the seismic receiver elements; and
use a modeling approach to model a measurement that would have been received by a seismic receiver element located behind a last of the seismic source elements, wherein the modeled measurement is used to compute the far-field signature.

8. The apparatus of claim 7, wherein the seismic source elements are configured to release air bubbles to generate seismic signals detectable by the seismic receiver elements.

9. The apparatus of claim 8, wherein dynamically associating the seismic receiver elements with different ones of the seismic source elements comprises dynamically associating seismic receiver elements with closest air bubbles over time.

10. The apparatus of claim 9, wherein the controller is configured to perform the dynamic association by varying distance parameters over time, wherein the distance parameters represent respective distances between seismic source elements and seismic receiver elements.

11. An article comprising at least one computer-readable storage medium containing instructions that when executed cause a computer to:

receive measurement data corresponding to signals received by a plurality of seismic receiver elements due to seismic signals produced from seismic source elements towed on a first cable, wherein the plurality of seismic receiver elements are provided to measure data useful for computing a far-field signature of a seismic source including the seismic source elements, wherein a number of the plurality of seismic receiver elements is greater than a number of the seismic source elements, and wherein the plurality of seismic receiver elements include at least one additional seismic receiver element behind a last seismic source element in an in-line direction, the plurality of seismic receiver elements including the at least one additional seismic receiver element being towed on the first cable that tows the seismic source elements;

dynamically associate the seismic receiver elements with different ones of the seismic source elements over time, wherein dynamically associating the seismic receiver elements with the different ones of the seismic source elements comprises dynamically varying, over time, parameters representing distances between the seismic receiver elements and seismic source elements in a formula; and compute, by solving the formula, the far-field signature of the seismic source according to measurement data taken by the seismic receivers and the dynamic association.

12. The article of claim 11, wherein dynamically associating seismic receiver elements with different ones of the seismic source elements over time comprises dynamically associating, over time, the seismic receiver elements and with different ones of air bubbles released by the seismic source elements.

13. A method comprising:
dynamically associating, by a controller including a processor, seismic receiver elements with different ones of seismic source elements over time, the seismic source elements being part of a seismic source towed in a body of water;
using, by the controller, a modeling approach to model a measurement that would have been received by a seismic receiver element located behind a last of the seismic source elements; and
computing, by the controller, a far-field signature of the seismic source according to measurement data taken by the seismic receiver elements and the modeled measurement.

14. The method of claim 13, wherein the seismic source elements are configured to release air bubbles to generate seismic signals detectable by the seismic receiver elements.

15. The method of claim 14, wherein dynamically associating the seismic receiver elements with different ones of the seismic source elements comprises dynamically associating seismic receiver elements with closest air bubbles over time.

16. The method of claim 13, wherein the dynamically associating comprises varying distance parameters over time, wherein the distance parameters represent respective distances between seismic source elements and seismic receiver elements in a formula.

17. The method of claim 16, wherein computing the far-field signature comprises solving the formula.

* * * * *